(12) United States Patent
Kauppert et al.

(10) Patent No.: US 11,569,855 B2
(45) Date of Patent: Jan. 31, 2023

(54) RADIO RECEIVER AND COMMUNICATIONS SYSTEM

(71) Applicant: Diehl Metering Systems GmbH, Nuremberg (DE)

(72) Inventors: Thomas Kauppert, Nuremberg (DE); Klaus Gottschalk, Winkelhaid (DE); Hristo Petkov, Nuremberg (DE); Raphael Mzyk, Kammerstein (DE)

(73) Assignee: Diehl Metering Systems GmbH, Nuremberg (DE)

( * ) Notice: Subject to any disclaimer, the term of this patent is extended or adjusted under 35 U.S.C. 154(b) by 79 days.

(21) Appl. No.: 16/999,829

(22) Filed: Aug. 21, 2020

(65) Prior Publication Data

US 2020/0389197 A1 Dec. 10, 2020

Related U.S. Application Data

(63) Continuation of application No. PCT/EP2019/053975, filed on Feb. 18, 2019.

(30) Foreign Application Priority Data

Feb. 28, 2018 (DE) .................. 10 2018 001 556
Apr. 17, 2018 (DE) .................. 10 2018 003 106

(51) Int. Cl.
*H04B 1/16* (2006.01)
*H04B 1/00* (2006.01)
*H04L 12/16* (2006.01)

(52) U.S. Cl.
CPC ............ *H04B 1/16* (2013.01); *H04B 1/0003* (2013.01); *H04L 12/16* (2013.01)

(58) Field of Classification Search
CPC ...... H04B 1/16; H04B 1/0003; H04B 1/0021; H04B 1/0046; H04L 12/16
See application file for complete search history.

(56) References Cited

U.S. PATENT DOCUMENTS

| 7,567,626 | B2 | 7/2009 | Hammes et al. |
| 9,240,771 | B2 * | 1/2016 | Lee ...................... H04B 1/0021 |
| 9,354,081 | B2 | 5/2016 | Bernhard et al. |
| 10,356,736 | B2 | 7/2019 | Reinhardt et al. |
| 10,396,912 | B1 * | 8/2019 | Hueber .................. H04B 17/19 |

(Continued)

FOREIGN PATENT DOCUMENTS

| DE | 102004052897 A1 | 5/2006 |
| DE | 102016111297 A1 | 12/2017 |

(Continued)

*Primary Examiner* — Dac V Ha
(74) *Attorney, Agent, or Firm* — Laurence A. Greenberg; Werner H. Stemer; Ralph E. Locher

(57) ABSTRACT

A software defined radio type radio receiver is used in an environment that is self-sufficient in energy. The radio receiver has a receiving device, which receives the data in the form of a data packet or a portion thereof or a data stream at a certain data rate, and provides the data for further data processing. Wherein in an operating mode, the data is diverted at the receiving device and supplied to a microcontroller at a sampling rate which preferably can be defined. The microcontroller decimates the data by selecting a subset from the set of samples, and the microcontroller buffers in a memory and provides for further processing the decimated data.

20 Claims, 10 Drawing Sheets

(56) References Cited

U.S. PATENT DOCUMENTS

| | | | | |
|---|---|---|---|---|
| 2002/0118977 | A1* | 8/2002 | Hasegawa | G03G 15/2003 |
| | | | | 399/69 |
| 2008/0232511 | A1 | 9/2008 | Menkhoff | |
| 2012/0129480 | A1* | 5/2012 | Ruelke | H04B 1/001 |
| | | | | 455/296 |
| 2014/0241468 | A1* | 8/2014 | Seely | H04L 1/0003 |
| | | | | 375/340 |
| 2016/0373125 | A1* | 12/2016 | Pagnanelli | H03M 3/436 |
| 2018/0246665 | A1* | 8/2018 | Wang | G06F 3/0604 |
| 2019/0379522 | A1* | 12/2019 | Mzyk | H04L 7/0025 |
| 2021/0021661 | A1* | 1/2021 | Karlsson | G06T 3/0056 |

FOREIGN PATENT DOCUMENTS

| | | |
|---|---|---|
| EP | 2469717 A2 | 6/2012 |
| EP | 3002560 B1 | 5/2017 |
| WO | 2006126166 A2 | 11/2006 |

* cited by examiner

RADIO RECEIVER AND COMMUNICATIONS SYSTEM

CROSS-REFERENCE TO RELATED APPLICATION

This application is a continuation, under 35 U.S.C. § 120, of copending international application No. PCT/EP2019/053975, filed Feb. 18, 2019, which designated the United States; this application also claims the priority, under 35 U.S.C. § 119, of German patent applications DE 10 2018 001 556, filed Feb. 28, 2018 and DE 10 2018 003 106, filed Apr. 17, 2018; the prior applications are herewith incorporated by reference in their entirety.

BACKGROUND OF THE INVENTION

Field of the Invention

The present invention relates to radio receivers according to the preamble of the independent radio receiver claims, and to a communication system for transferring data.

The radio receivers of the software defined radio (SDR) type that are of interest here typically contain a receiving device such as a radio chip, for instance, and are used especially on battery-powered, stationary sensor arrangements employing unidirectional or bidirectional data transfer. For example, the data to be received is data for operating the sensor arrangement, for instance update data, program data, control data or the like, which is transmitted from a concentrator to the radio receiver. Minimum possible energy consumption at the radio front-end is amongst the reasons why the data, or data messages, is transmitted by the concentrator in a fragmented form of individual data packets, or portions thereof (e.g. data subpackets), rather than in one piece, and received in this form by the radio receiver.

Conventional radio chips are usually low-price components having functions that are permanently integrated in the radio chip and can only be modified to a very limited extent. Especially for narrow-band radio transfers, the sampling rate, for example, must be met precisely, something which cannot be set so precisely in the radio chips, however. If the sampling rate cannot be met precisely, extensive processing effort is needed for resampling, something that requires a correspondingly large amount of electrical energy, and is undesirable or not possible because the environment is self-sufficient in energy. In addition, the A/D converter (analog-to-digital converter) contained in the radio chip is typically clocked by a clock generator, and therefore the sampling rate of the radio chip can be set only very imprecisely. At the same time, especially for the aforementioned uses, the aim is to provide radio receivers that have a maximum possible range.

European patent EP 3 002 560 B1, corresponding to U.S. Pat. No. 9,354,081, discloses a battery-powered, stationary terminal (or more precisely a sensor arrangement) for performing a wireless unidirectional transfer. The terminal contains a sensor for obtaining sensor data and for providing a sensor data packet based on the sensor data. A device for generating data packets is used to divide the sensor data packet into at least three data packets, where each of the data packets is shorter than the sensor data packet itself. In addition, the sensor arrangement contains a device for transmitting data packets, which is intended to transmit the data packets over a communication channel at a data rate of less than 50 kbit/s and spaced apart in time. By virtue of the low data rate compared with conventional data rates of 100 kbit/s, it is possible to reduce the signal-to-noise ratio at a data receiver (concentrator). Furthermore, the device for generating data packets channel-codes the data packets such that only a subset of the data packets are required for decoding the sensor data packet. The transmit range from the terminal to the concentrator is thus increased by using a terminal of this type. The use of such a terminal cannot, however, achieve any improvement in the data transfer quality in the transfer from the concentrator to the terminal.

SUMMARY OF THE INVENTION

The object of the present invention is thus to provide a radio receiver, in particular for a terminal of the type in question, that has both improved data transfer quality and optimized power consumption.

The aforementioned object is achieved by a radio receiver as claimed in the first independent claim and by the additional independent claims. The further claims define expedient embodiments of the invention.

A radio receiver according to the invention may be an SDR-type radio receiver. Within the meaning of the invention, "SDR type" covers designs for radiofrequency transmitters and receivers in which the signal processing is implemented by software to a greater or lesser degree. For this purpose, the radio receiver contains a receiving device (e.g. a radio chip) that receives the data in the form of at least one data packet or a portion thereof (data subpacket) or a data stream at a certain data rate, and provides the data for further data processing. In particular, the data stream may be a continuous data stream or semi-continuous data stream (i.e. containing breaks).

By virtue of the fact that, in an operating mode A, the data is diverted within the receiving device and supplied to a microcontroller, the microcontroller or the receiving device decimates the data, namely by the microcontroller or receiving device selecting only a subset of the set of samples, and the microcontroller buffers in a memory and provides for further processing the decimated data, it is possible for data to be supplied to further processing without the microcontroller having a large processing power and without any resampling. Only relatively little energy is needed for this, and consequently only a small load is placed on the autonomous energy source. The data transfer quality is thereby improved while power consumption is reduced or optimized.

The receiving device expediently contains a filter, which filters the data before supplying to the microcontroller in order to reduce unnecessary processing operations on the part of the microcontroller. This hence additionally improves the data transfer quality and reduces the energy consumption.

In addition, the data can be decimated by the microcontroller by the microcontroller disregarding, i.e. discarding, individual samples of the set of samples, and the samples being selected on the basis of an integer decimation factor. This reduces the transferred set of samples, whereby the bandwidth for transferring the data between receiving device and microcontroller can also be reduced. The sampling rate thus represents the maximum possible unfiltered bandwidth between receiving device and microcontroller, and preferably equals an integer factor of the bandwidth used after the filter (filtered bandwidth).

It has proved particularly advantageous if the bandwidth of the data provided to the microcontroller, or the bandwidth used after the filter, is preferably less than 200 kHz, preferably less than 100 kHz and more preferably less than 50 kHz.

By virtue of being able to define different sampling rates at the microcontroller for different bandwidths, the transfer of the data can be adapted to different or abruptly changing transfer conditions. In this case, different data rates can be supported in the radio system in order to adapt the rates to abruptly changing transfer conditions, for instance. Thus different sampling rates and hence bandwidths are needed for different data rates. This improves the data transfer quality even further.

A clock generator, preferably a crystal oscillator or an oscillator containing an RF crystal or a crystal oscillator, is preferably provided. The sampling rate is preferably defined by the clock frequency (or crystal frequency) of the clock generator. The clock generator can also act as the clock for the analog-to-digital converter, as a result of which, by changing the clock frequency or selecting a clock generator having a certain clock frequency, the clocking of the analog-to-digital converter is also changed accordingly. Taking into account the decimation factor, the clock frequency is defined or selected here so as to result in the desired sampling rate. This avoids complex resampling by the microcontroller.

It has proved particularly advantageous for the clock frequency of the clock generator to lie between 20 MHz and 50 MHz, preferably between 23 MHz and 25 MHz, 38 MHz and 40 MHz or 47 MHz and 49 MHz, more preferably at 24 MHz, 39 MHz or 48 MHz.

The sampling error that arises during sampling can expediently be changed by the selection of the clock frequency of the clock generator. The clock frequency is preferably reduced in this process.

It is particularly expedient if the error in the clock generator or in the crystal after the change in the clock frequency is less than 10 ppm, preferably less than 5 ppm, more preferably less than 3 ppm.

The radio receiver can expediently enable and disable the operating mode A. This results in the advantage that the receiving and forwarding, or further processing, of the data can be performed selectively via operating mode A, and can also be enabled and/or disabled during operation, so that it is possible to respond flexibly to changes in the transfer and processing procedure. The data transfer quality and processing reliability are hence improved appreciably.

According to a preferred embodiment, an operating mode C can be provided in addition to operating mode A, in which operating mode C, the data is processed by a microprocessor or logic circuit or digital receiving circuit, which is connected after the receiving device and/or is part of the receiving device. It is particularly advantageous here if the radio receiver is configured such that it can switch between operating mode A and operating mode C. This can be performed in particular by means of a switchover device, for instance which is an integral part of the receiving device.

The data is transferred between the receiving device and the microcontroller preferably in a fragmented manner, i.e. in steps, wherein time intervals in which no transfer takes place are provided between the data transfer steps.

According to a preferred embodiment, in the time intervals in which no data is transferred, the microcontroller can shift into a standby or sleep mode in order to reduce the energy consumption within these time periods. This can make appreciable savings in energy, and hence, for instance, extend the period of use or lifespan of a battery-powered terminal that is self-sufficient in energy.

The microcontroller can expediently also be configured to decode the data. This economizes on an additional decoder.

Alternatively or additionally, it is also possible that the microcontroller is intended to process higher layers as well (in particular of the OSI layer model). For example in this case, the microcontroller can take on also program and/or execution functions of the terminal, for instance functions such as sensor control or evaluating the sensor readings. It is hence possible to economize on an additional microcontroller for controlling the sensors, thereby reducing appreciably the energy consumption and the manufacturing costs.

The receiving device, the microcontroller and/or the decoder can expediently be embodied as a common structural unit. It has proved particularly advantageous when the receiving device, the microcontroller and/or the decoder are in the form of an integrated circuit (IC). This results in the advantage that the IC can be installed easily and particularly economically in/on the radio receiver.

The data is preferably processed by means of the I/Q technique (In-phase/Quadrature technique) after entering the receiving device, i.e. the data is digital I/Q data. This can be done, for example, by splitting the analog input signal into two signal components, where one signal component is generated with the original phase (I data), and the other signal component is generated with reference frequency shifted through 90° (Q data).

The SDR-type radio receiver is intended for use in an environment that is self-sufficient in energy, preferably self-sufficient in energy over the long-term. Within the meaning of the invention, self-sufficient in energy, or self-sufficient in energy over the long-term, is understood to mean in particular a mode of operation in which the radio receiver, or the terminal comprising the radio receiver, is operated without an external energy supply and can perform or maintain operation independently. The energy needed for operation is preferably drawn from an energy storage device or energy source. A battery that is fitted inside the radio receiver or the terminal, and, if applicable, encapsulated such that it is dust-proof and watertight, is preferably provided as the energy source. In particular, the battery has a capacity of less than 20 Ah. In addition, means for obtaining electrical energy can also be provided (energy harvesting), in which case the electrical energy needed for operation is obtained in particular from the air flow, from the ambient light, from the ambient temperature, or from vibrations (e.g. by piezoelectric effects). A combination of battery and energy harvesting can also advantageously be provided, whereby it is possible to optimize yet further the power consumption, in particular in the case of the present SDR concept.

The present invention also claims an SDR-type radio receiver for use in an environment that is self-sufficient in energy, preferably self-sufficient in energy over the long-term, having a receiving device that receives, and provides for further data processing, the data in the form of at least one data packet or a portion thereof or in a data stream at a certain data rate (and/or at a certain sampling rate). In this case, in an operating mode B, the data is supplied to a microprocessor or to a digital receiving circuit (logic circuit), each of the receiving device. Then the data is filtered by the microprocessor or the digital receiving circuit, and subsequently decimated, which is done by the microprocessor or digital receiving circuit selecting a subset from the set of samples. In practice, the decimation can be performed by the microprocessor, for instance, and the algorithmic procedure or signal processing (e.g. decoding, demodulation and/or such like) by the microcontroller. Alternatively or additionally, however, the microprocessor can also perform the algorithmic procedure or signal processing.

The radio receiver can expediently enable and disable operating mode B. Furthermore, operating mode C can also be provided in addition to operating mode B, wherein the radio receiver can switch between operating mode B and operating mode C by means of the switchover device.

A further radio receiver, which is claimed in another independent claim, is a radio receiver of a type in which the signal processing is implemented at least mainly, although preferably entirely, by hardware (e.g. as a prefabricated hardware module). Consequently, this is explicitly not an SDR-type radio receiver. For example, this radio receiver can be embodied wholly as an application-specific integrated circuit (ASIC). Hence the function of the radio receiver can no longer be altered by means of software. Using such a radio receiver can reduce the manufacturing costs appreciably. In this case, the radio receiver contains a clock generator, in particular a crystal oscillator. Selecting the clock generator that has a suitable clock frequency modifies, in particular reduces, the sampling error. Hence the sampling error can be defined or controlled by selecting the clock frequency, or selecting the clock generator that has a certain clock frequency. The radio receiver can preferably also be designed such that it can be operated in operating mode A, B and/or C.

In another independent claim, the present invention claims a communication system for transferring data between at least one concentrator and a plurality of, in particular a multiplicity of, terminals that are self-sufficient in energy. In this case, each terminal contains a radio receiver having a receiving device that receives, and provides for further data processing, the data from the concentrator, in the form of at least one data packet, preferably a plurality of individual data packets, at a certain data rate (and/or at a certain sampling rate). In addition, a radio receiver according to the invention is provided as the radio receiver, which, in an operating mode A, diverts the data within the receiving device and supplies the data to a microcontroller at a sampling rate which preferably can be defined. The microcontroller or the receiving device in this case decimates the data by selecting a subset from the set of samples. Then the microcontroller buffers the decimated data in a memory and provides the data for further processing, for instance. Alternatively or additionally, the radio receiver can also, in an operating mode B, supply the data to a microprocessor or to a digital receiving circuit, each of the receiving device, and by means of the microprocessor or the digital receiving circuit, filter the data and then decimate said data by selecting a subset of the set of samples.

Other features which are considered as characteristic for the invention are set forth in the appended claims.

Although the invention is illustrated and described herein as embodied in a radio receiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
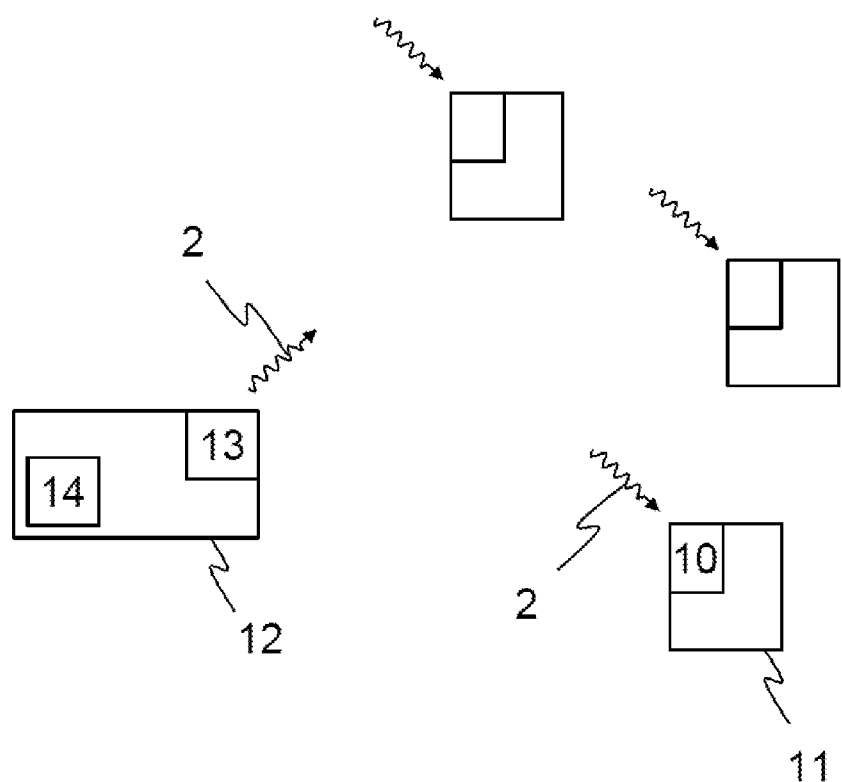
FIG. 1 is a simplified schematic diagram of a communication system containing a plurality of terminals and a concentrator.

Referring now to the figures of the drawings in detail and first, particularly to FIG. 1 thereof, there is shown a communication system according to the invention, in which a plurality of terminals 11, each having an integrated radio receiver 10 of a software defined radio (SDR) type, communicate with a transceiver 13 of a data collector 12 via radio. For example, the terminals 11 may be consumption meters such as gas, water, heating or energy meters, for instance, sensor units such as level sensors or temperature measuring devices, for instance, or other sensor nodes, e.g. of an Internet of Things (IoT) application. The receiving device 1 may be embodied as a radio chip, SoC (System-on-Chip), SoS (System-on-Silicon), SIP (System-in-Package) or the like. Explicitly, neither the terminal 11 nor the receiving device 1 is a gateway. The data collector 12 is configured here such that it can transfer the data 2 to the terminals 11, and/or receive the data therefrom, via the transceiver 13.

Figure 2:
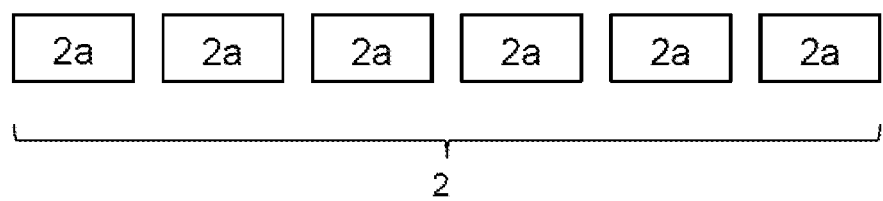
FIG. 2 is a simplified schematic diagram of data that is transmitted in the form of a plurality of data packets.

For example, the data 2 may be operating data or program update data or firmware update data, which in particular is transferred from the data collector 12 to the terminals 11. The data collector 12 can receive the data 2 from, for example, a higher-level central unit (not shown in the figures), store the data in a data memory 14, and then transmit the data to the terminals 11. In this process, the data 2 is transferred, as shown in FIG. 2, in the form of at least one data packet, preferably a plurality of data packets 2a.

Figure 3:
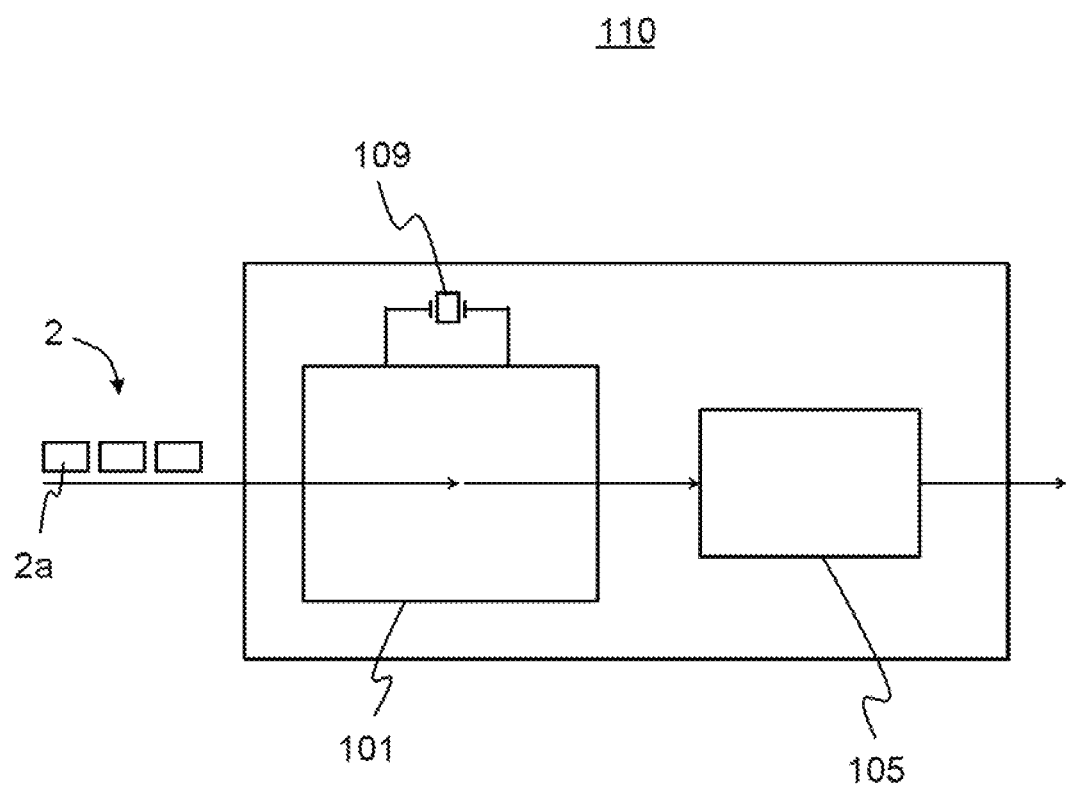
FIG. 3 is a simplified schematic diagram of a radio receiver according to the prior art.

FIG. 3 shows a radio receiver 110 of the type in question that is known from the prior art. In this case, in an operating mode C, a receiving device 101 of the radio receiver 110 receives the data 2 or data packets 2a as an analog input signal, and demodulates same. An analog-to-digital converter (not shown in the figures) is provided in order to convert the analog input signal into a digital data stream. A microprocessor 115, which is assigned to the receiving device 101 or connected thereafter, is used for further processing and/or forwarding of the data 2. In addition, the radio receiver 110 contains an oscillator or clock generator, which is used to define the frequency that is used.

Figure 4:
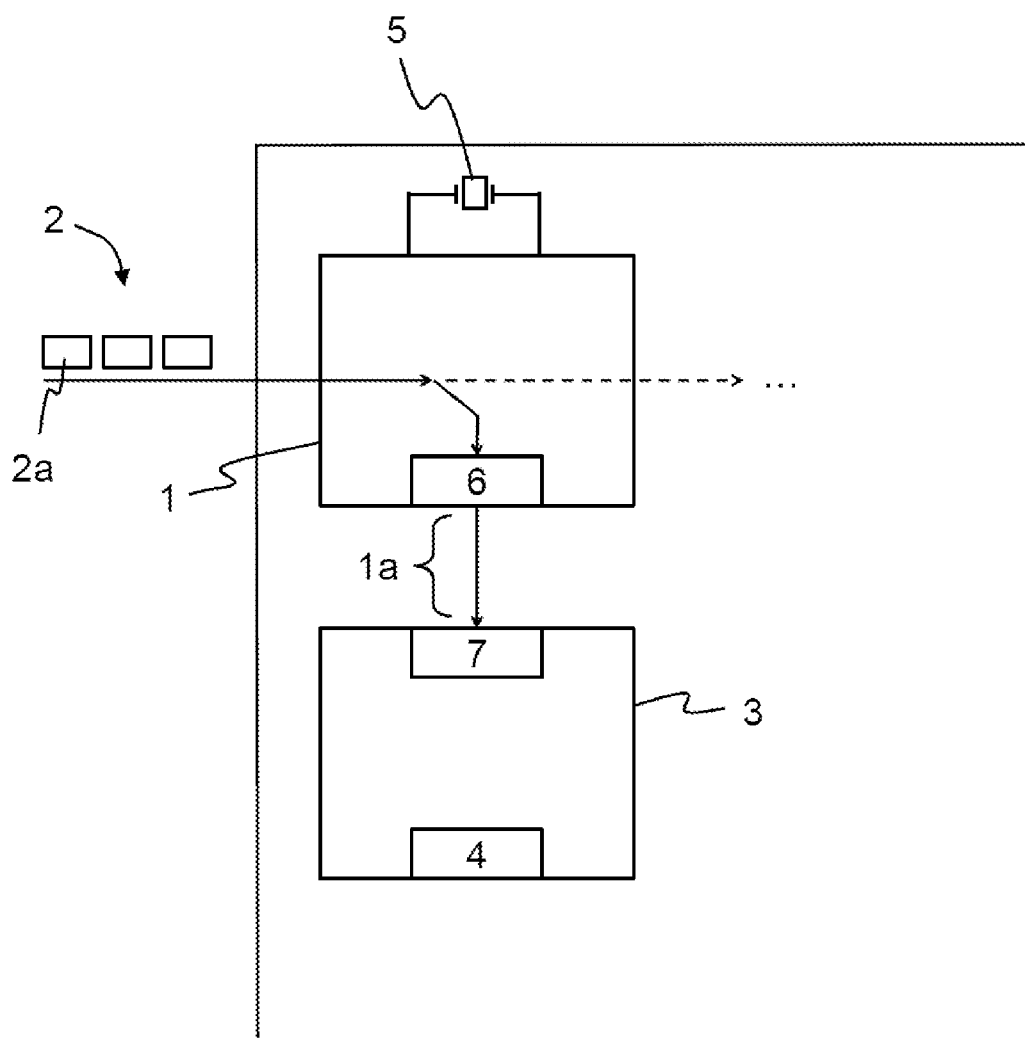
FIG. 4 is a simplified schematic diagram of a first embodiment of the radio receiver according to the invention.

FIG. 4 shows an embodiment of the radio receiver 10 according to the invention. The radio receiver 10 contains a receiving device 1 and a microcontroller 3, and is preferably embodied as a common structural unit, for instance as an integrated circuit (IC). According to the invention, the data 2 or data packets 2*a*, which are received as an analog signal, are diverted within the receiving device 1 and supplied to the microcontroller 3 via an interface 1*a*. The receiving device 1 prepares the data in a way that reduces or even avoids complex processing operations by the microcontroller 3, without any substantial degradation, e.g. as a result of aliasing. This is done by first digitizing the data 2 by means of the analog-to-digital converter (not shown in the figures), which is arranged preferably inside the receiving device 1, and filtering the data by means of the filter 6 of the receiving device 1. In this case, the digitized data is provided to the microcontroller 3 at a bandwidth that is less than or equal to the sampling rate, e.g. less than 50 kHz. The filter 6 then filters the data 2 such that the microcontroller 3 does not have to perform any more filtering. The sampling rate here describes how many times in one second the analog signal (a time-continuous signal) is sampled, i.e. measured, and converted into a time-discrete signal. For example, a value of 2 kHz or 4 kHz indicates that 2000 or respectively 4000 samples are taken within one second. The sampling rate to the microcontroller 3 here specifies the bandwidth, i.e. the sampling rate represents the maximum unfiltered bandwidth that can be set between receiving device 1 and microcontroller 3. For example, for a sampling rate of 20 kHz, a maximum bandwidth of 20 kHz is theoretically possible, but as a result of the filtering by the filter 6, the transfer to the microcontroller 3 is at a bandwidth of only 10 kHz (factor=2).

The bandwidth for transferring the data 2 from the receiving device 1 to the microcontroller 3 is thus less than or equal to the sampling rate. This can be achieved in particular by the microcontroller 3 decimating the data 2 within a decimation unit 7 by a definable decimation factor N, i.e. the microcontroller 3 selects a subset of the set of samples supplied by the receiving device 1. The decimation factor N is preferably an integer, for instance 2, 3 or 4. For a decimation factor N=2, for example, the microcontroller 3 omits every second sample, resulting in the bandwidth being less than the sampling rate by a factor of 2.

Figure 5:
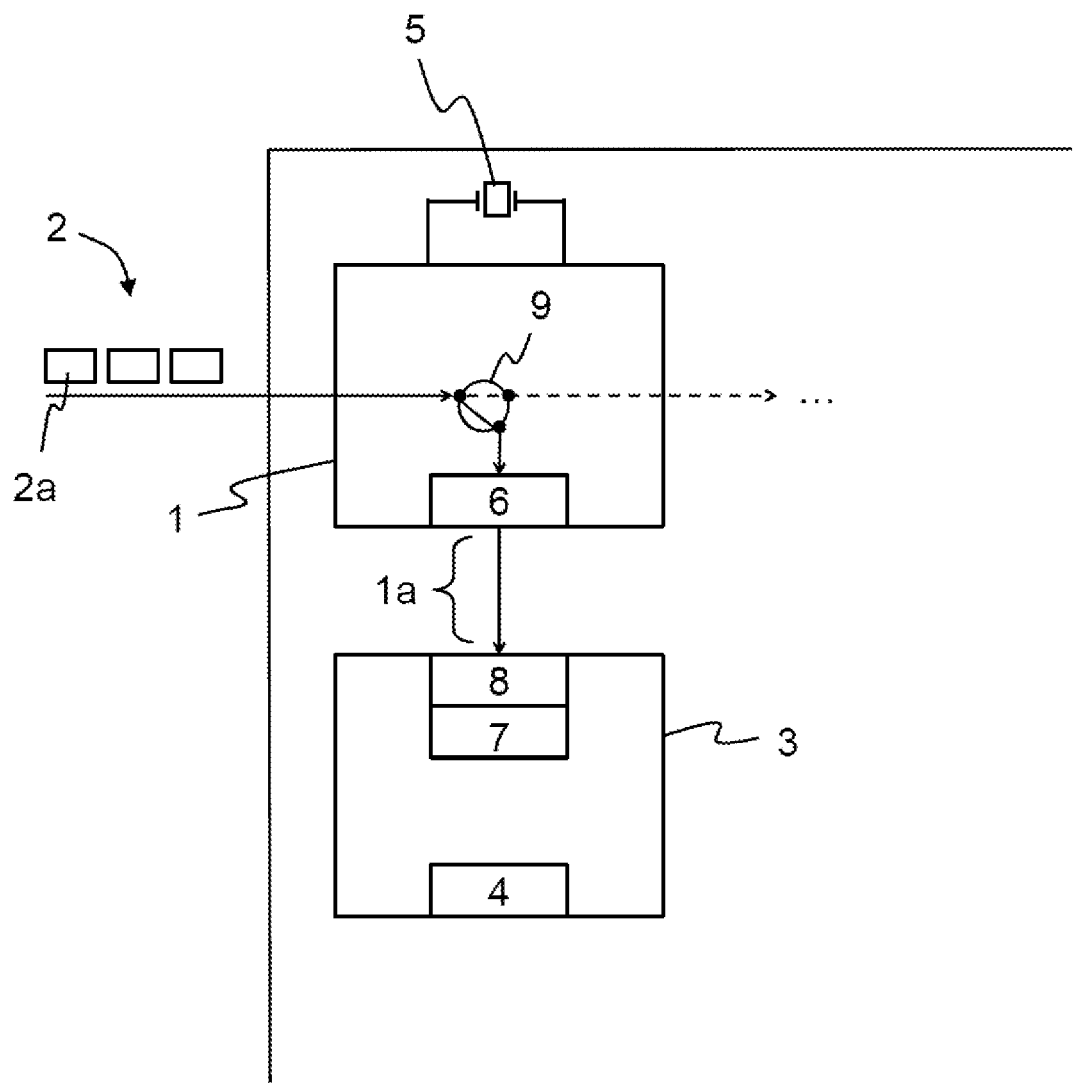
FIG. 5 is a simplified schematic diagram of a further embodiment of the radio receiver according to the invention.

As an alternative to, or in addition to, the filter 6, the microcontroller 3 can also comprise a filter 8, as shown in FIG. 5. Then the microcontroller 3 can store, or buffer, the decimated data in a memory 4, for example in blocks, in order to provide the decimated data for further processing, for instance. A crystal oscillator 5 is used here as a clock generator for the frequency conditioning and the carrier frequency, and also for clocking the analog-to-digital converter. Either an external unit or a structure that belongs functionally to the receiving device 1 can be provided as the clock generator. The sampling rate is defined in particular by varying the clock frequency of the crystal oscillator 5 accordingly, or selecting the crystal oscillator 5 on the basis of its clock frequency, in order to change the clocking of the analog-to-digital converter accordingly. The clock frequency is defined such that the crystal oscillator 5 specifies, together with the divisor or the decimation factor N, the required sampling rate. Additional filtering on the part of the microcontroller 3, or energy-intensive resamples, are hence not necessary.

The data 2 is preferably processed by means of the I/Q technique (In-phase/Quadrature technique) after entering the receiving device 1, i.e. is converted into I/Q data (digital data). This is done by splitting the analog input signal into two signal components, where one signal component is demodulated with the original phase (I data), and the other signal component is demodulated with reference frequency shifted through 90° (Q data). The I/Q data is then forwarded by the receiving device 1 to the microcontroller 3. The microcontroller 3 can then process the data further in an algorithmic procedure, or use the data for signal processing.

The mode of operation shown in FIG. 4 and FIG. 5 represents, for instance, the first operating mode A, which can be enabled and disabled selectively in the radio receiver 10 even during operation. In addition, the operating mode C, which is represented by the dashed arrow in FIGS. 4 and 5, can be provided in addition to operating mode A. In this embodiment of the radio receiver 10, a selection or switchover device 9 can be used to select or switch between operating mode A and operating mode C.

Figure 6:
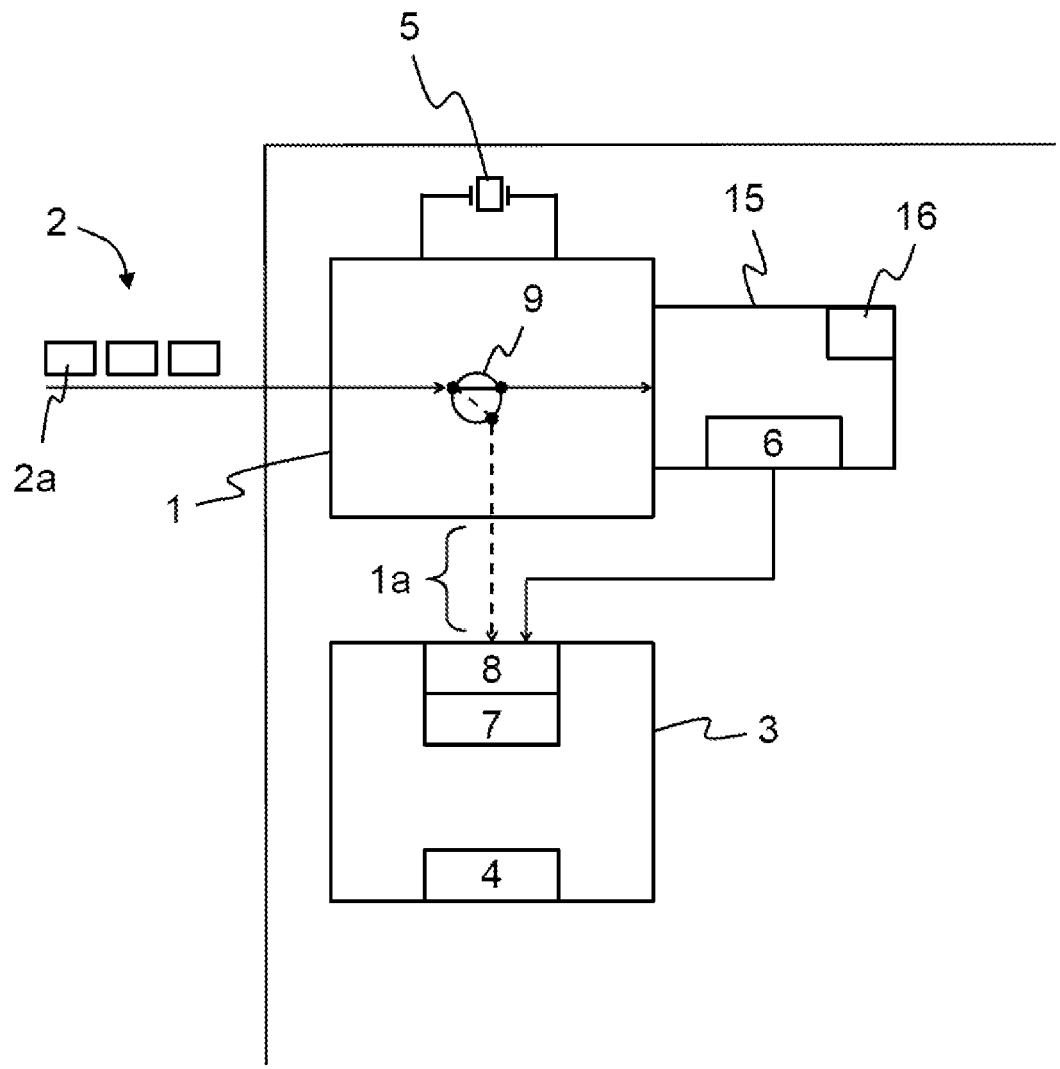
FIG. 6 is a simplified schematic diagram of a further embodiment of the radio receiver according to the invention.
Figure 7:
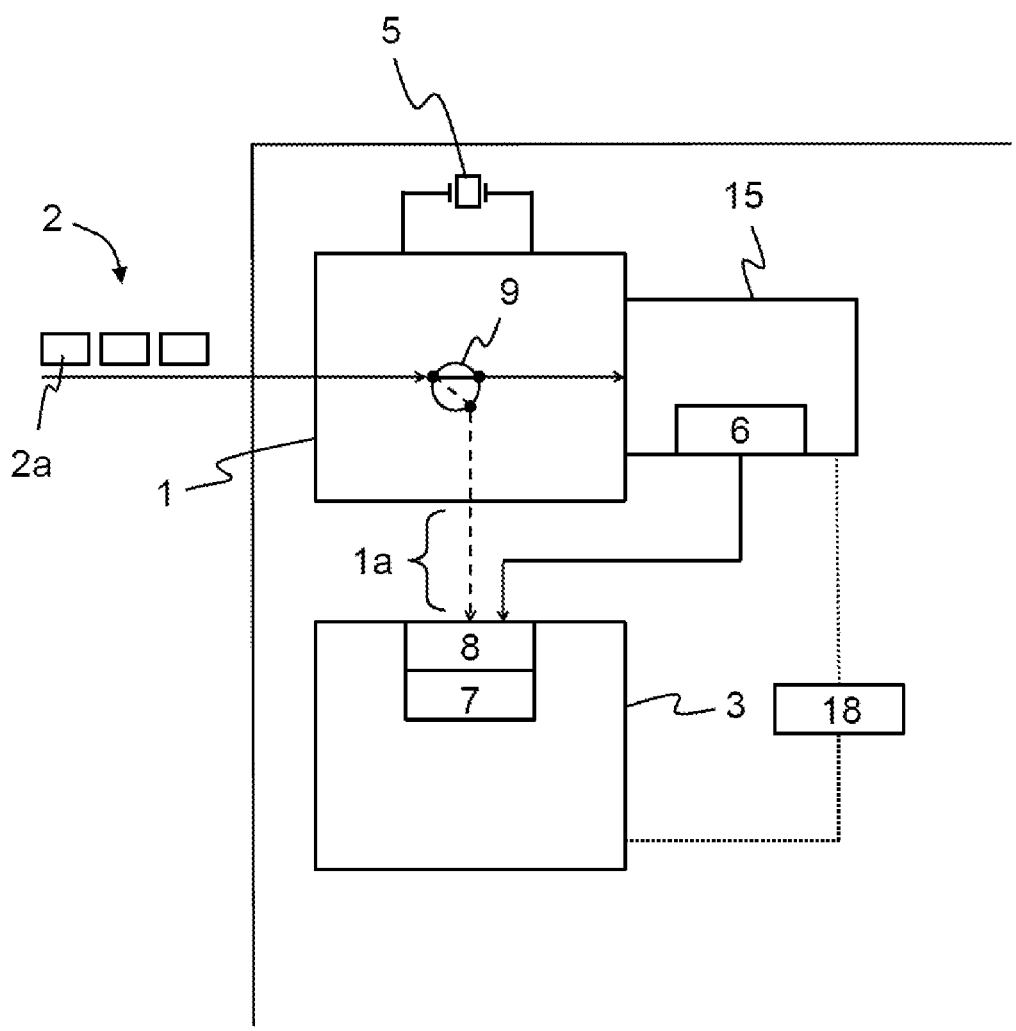
FIG. 7 is a simplified schematic diagram of a further embodiment of the radio receiver according to the invention.

The embodiment of the radio receiver shown in FIG. 6 is operated by means of an operating mode C. For this purpose, the receiving device 1 contains a microprocessor 15, which alternatively can also be embodied as a digital receiving circuit. In this case, the microprocessor 15 is part of an RF front-end containing an analog-to-digital converter (not shown in the figures for the sake of clarity). In addition, the microprocessor 15 can comprise the filter 6 and a dedicated memory, in particular a RAM memory 16. Alternatively or additionally, a shared (RAM) memory 18 can be provided, as shown in FIG. 7, which the microcontroller 3 and the microprocessor 15 can access, for instance via a BUS system. Furthermore, an additional operating mode can be provided, which is represented by the dashed lines and arrows in FIGS. 6 and 7 by way of example. The switchover between operating mode B and the additional operating mode can be performed selectively even during operation via the switchover device 9.

Figure 8:
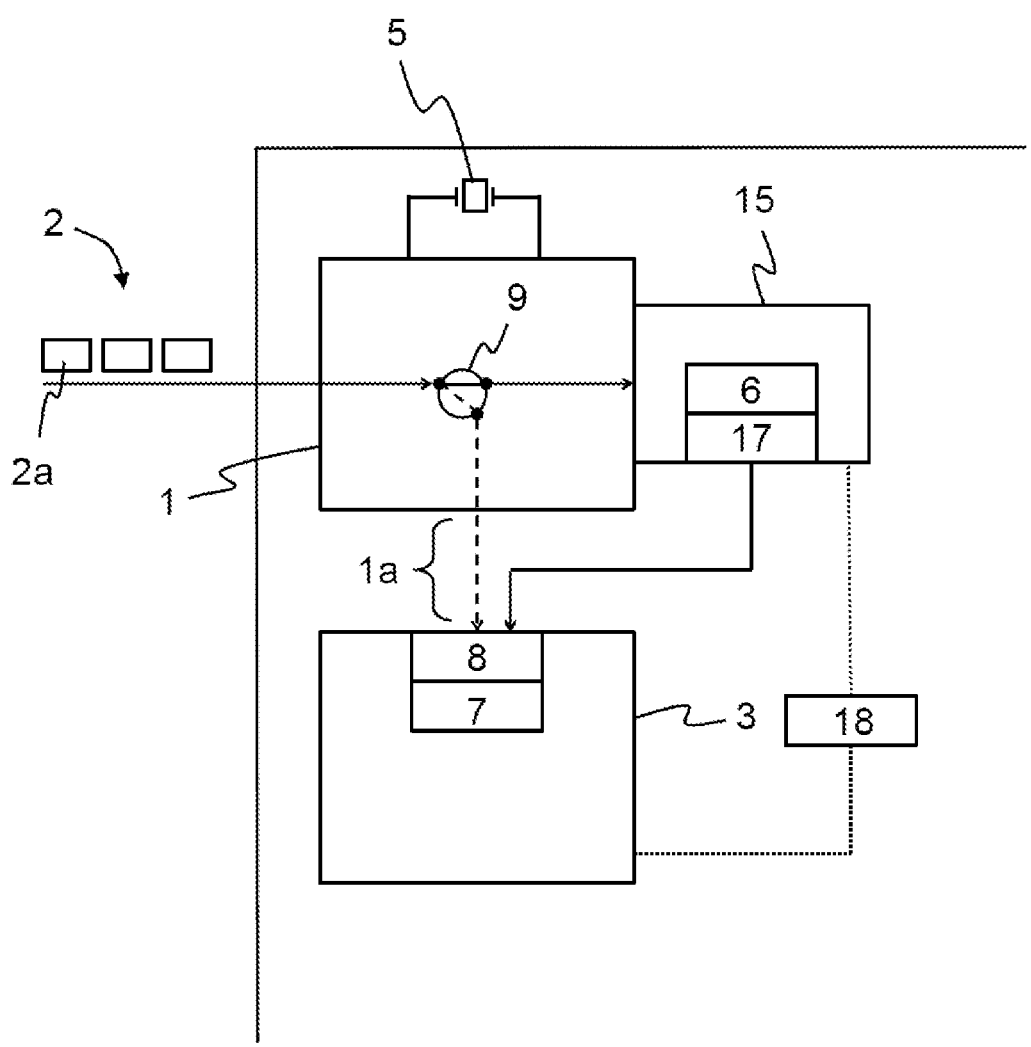
FIG. 8 is a simplified schematic diagram of a further embodiment of the radio receiver according to the invention.

FIG. 8 shows another alternative embodiment of the present invention, in which microprocessor 15 of the receiving device 1 comprises the filter 6 and additionally has a decimator 17, i.e. the microprocessor 15 filters and decimates the data before providing this data to the microcontroller 3 for signal processing and/or placing this data in the memory 18. It is optional in this case to equip the microcontroller 3 with a filter 8 and a decimation unit 7. The microcontroller 3 preferably has a greater efficiency for the required tasks, or has better performance than the microprocessor 15 in this case. The algorithmic procedure or signal processing can also be performed by the microprocessor 15, however, as long as it already has the required processing efficiency.

Figure 9:
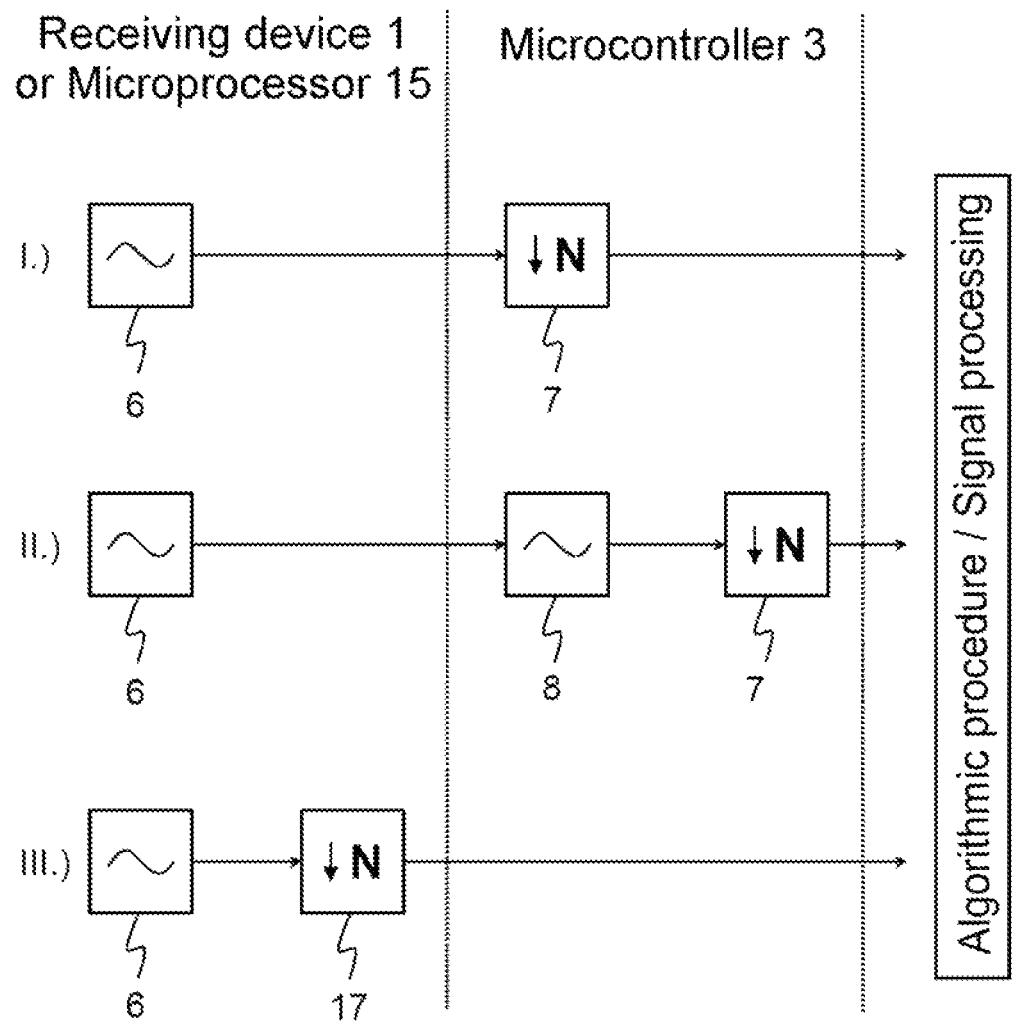
FIG. 9 is a simplified schematic diagram of different operating modes.

In addition, FIG. 9 shows different modes of operation I, II and III of the radio receiver 10. The receiving device 1 or microprocessor 15 first performs filtering by means of the filter 6. The filter 6 in particular may be a high-pass, low-pass or bandpass filter. In the event that the filtering has been performed sufficiently well for the decimation, the data can be conveyed, in accordance with mode of operation I, to the microcontroller 3, which uses the decimation unit 7 to decimate this data by the decimation factor N (e.g. 2 or 4) by using only every Nth sample and discarding the remaining samples. The microcontroller 3 can subsequently perform the algorithmic procedure or signal processing. In the event that it was not possible to perform the filtering sufficiently well for the decimation, the data is first filtered in the microcontroller 3 by the filter 8 in accordance with mode of operation II in order to achieve at least adequate filtering, and then decimated by the decimation unit 7. In addition, in accordance with mode of operation III, it is also possible for the data to be filtered by the microprocessor 15 or a digital receiving circuit of the receiving device 1 via the filter 6 and then to be decimated by means of the decimator 17 of the microprocessor 15. Then the decimated data is transferred to the microcontroller 3 for the algorithmic procedure or signal processing, or the microprocessor 15 can readily perform the algorithmic procedure or signal processing. In particular, the modes of operation I and II can be realized via operating mode A, for instance, and mode of operation III via operating mode B, for instance.

Figure 10:
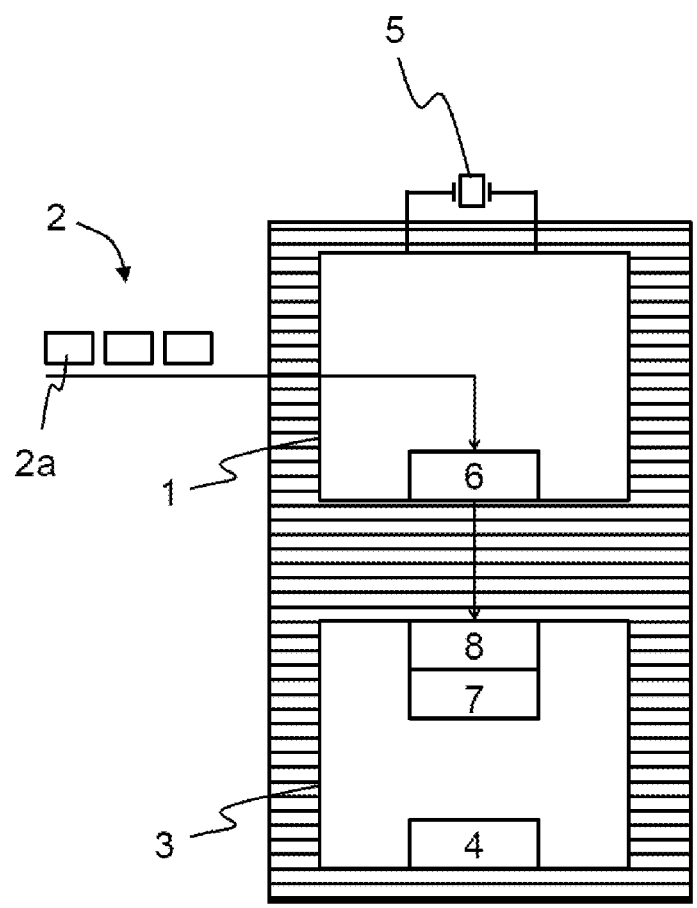
FIG. 10 is a simplified schematic diagram of a further embodiment of the radio receiver according to the invention.
Figure 11:
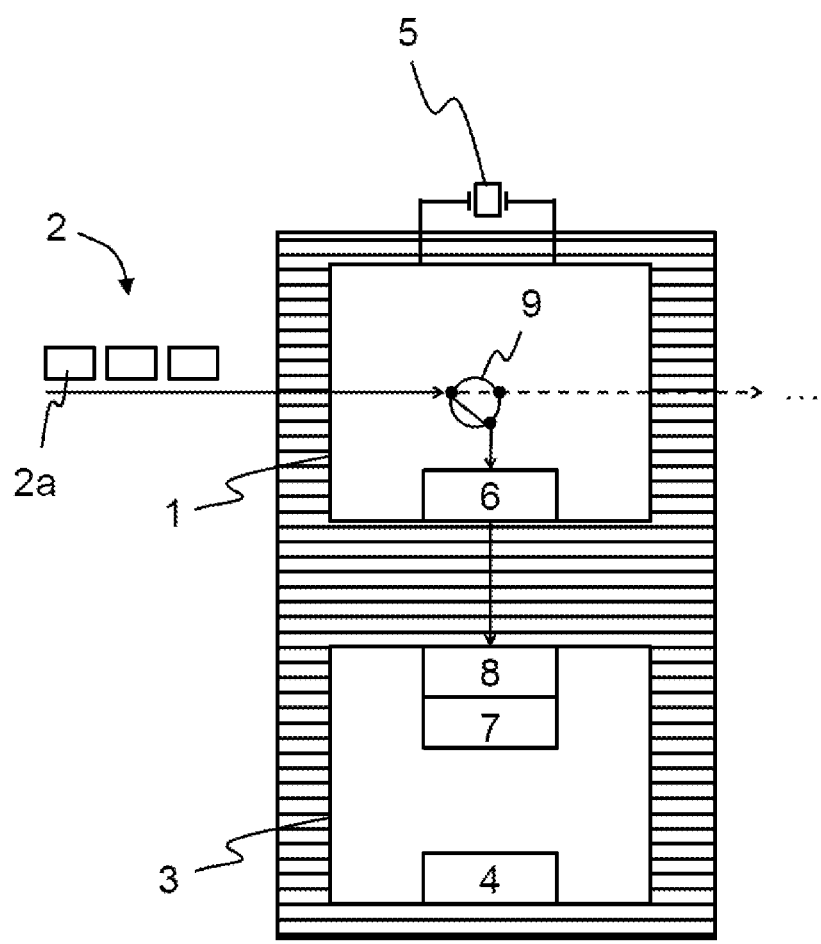
FIG. 11 is a simplified schematic diagram of a further embodiment of the radio receiver according to the invention.

FIG. 10 shows a further radio receiver 210 according to the invention, the radio receiver being of a type in which the signal processing is implemented entirely by hardware. In this case, the radio receiver 210 is embodied wholly as an application-specific integrated circuit (ASIC). A clock generator, in particular a crystal oscillator 5, is also provided. In this case, the sampling error is modified, in particular reduced, by selecting the clock generator on the basis of its clock frequency. The clock generator can preferably be selected already during the manufacturing process. In addition, the radio receiver 210 can also be configured, as shown in FIG. 11, such that it can perform operating mode A and additionally operating mode C (dashed arrow). As an alternative to the externally connected crystal oscillator 5, the radio receiver 210 can also comprise as the clock generator an internal clock such as an integrated oscillator circuit, for instance. In practice, the present invention also includes embodiments of the radio receiver 210 which are not shown and which are configured to perform the operating modes A, B and/or C and/or the modes of operation I, II and/or III, in particular in the manner described above in each case.

The disclosure explicitly includes also individual feature combinations (sub-combinations) and possible combinations of individual features of different embodiments, which possible combinations are not presented in the drawing figures.

The following is a summary list of reference numerals and the corresponding structure used in the above description of the invention:
1 receiving device
1a interface
2 data
2a data packet
3 microcontroller
4 memory
5 crystal oscillator
6 filter
7 decimation unit
8 filter
9 switchover device
10 radio receiver
11 terminal
12 concentrator
13 transceiver
14 data memory
15 microprocessor
16 RAM memory
17 decimator
18 shared memory
101 receiving device
105 crystal oscillator
110 radio receiver
115 microprocessor
210 receiving device

The invention claimed is:

1. A radio receiver for use in an environment that is self-sufficient in energy, the radio receiver comprising:
a microcontroller having a memory;
a receiving device with a microprocessor or a logic circuit or a digital receiving circuit, said receiving device receiving data in a form of at least one data packet or a portion thereof or a data stream at a certain data rate, and providing the data for further data processing, wherein the data is in-phase/quadrature (I/O) data;
said receiving device in an operating mode A, where received, or received and filtered, data is diverted at said receiving device and supplied to said microcontroller at a sampling rate which can be defined;
a switchover device, the operating mode A being selectable by said switchover device;
said microcontroller or said receiving device in the operating mode A decimates the data by selecting a subset from a set of samples;
said microcontroller in the operating mode A buffers in said memory and provides for further processing of decimated data;
wherein an operating mode C is provided in addition to the operating mode A, in which said operating mode C, the data is processed by said microprocessor or said logic circuit or said digital receiving circuit, which is connected after said receiving device and/or is part of said receiving device, before the processed data is transferred to said microcontroller for further processing; and
the operating mode C being selectable by said switchover device, and it is possible to switch between the operating mode A and the operating mode C.

2. The radio receiver according to claim 1, wherein the radio receiver is a software defined radio type.

3. The radio receiver according to claim 1, further comprising a clock generator, and the sampling rate is defined by a clock frequency of said clock generator.

4. The radio receiver according to claim 3, wherein the clock frequency of said clock generator lies between 20 MHz and 50 MHz.

5. The radio receiver according to claim 3, wherein an error in the clock frequency of said clock generator is less than 10 ppm.

6. The radio receiver according to claim 1, further comprising a clock generator; and
wherein the radio receiver is of a type in which signal processing is implemented at least mainly by hardware, and a sampling error is modified by selecting said clock generator on the basis of its clock frequency.

7. The radio receiver according to claim 1, wherein said receiving device has a filter that filters the data before supplying the data to said microcontroller.

8. The radio receiver according to claim 1, wherein said microcontroller has a filter that filters the data before decimation.

9. The radio receiver according to claim 8, wherein a bandwidth at which the data is supplied after said filter to said microcontroller is less than 200 kHz.

10. The radio receiver according to claim 1, wherein the data is decimated by said microcontroller disregarding individual samples of the set of samples supplied by said receiving device, and the individual samples being selected on a basis of an integer decimation factor.

11. The radio receiver according to claim 1, wherein different sampling rates can be defined at said microcontroller for different bandwidths.

12. The radio receiver according to claim 1, wherein the operating mode A can be enabled and/or disabled.

13. The radio receiver according to claim 1, wherein the data is transferred between said receiving device and said microcontroller in steps, and time intervals in which no transfer takes place are provided between a transfer of the data.

14. The radio receiver according to claim 13, wherein the time intervals in which no data is transferred, said microcontroller shifts into a sleep mode.

15. The radio receiver according to claim 1, wherein said microcontroller is configured to decode the data.

16. The radio receiver according to claim 1, wherein said microcontroller is configured to process also higher layers in addition to processing and storing the data.

17. The radio receiver according to claim 1, wherein said receiving device and said microcontroller are embodied as a common structural unit.

18. The radio receiver according to claim 1, wherein said radio receiver has an energy source for supplying energy.

19. A communication system for transferring data, the communication system comprising:
- at least one concentrator;
- a plurality of terminals that are self-sufficient in energy, each of said terminals containing said radio receiver according to claim 1, said receiving device receiving the data from said at least one concentrator in a form of at least one data packet or a portion thereof or a data stream at a certain data rate, and provides the data for further data processing.

20. A radio receiver for use in an environment that is self-sufficient in energy, the radio receiver comprising:
- a microcontroller having a memory;
- a receiving device receiving data in a form of at least one data packet or a portion thereof or a data stream at a certain data rate, and provides the data for further data processing, said receiving device in an operating mode A, where received, or received and filtered, data is diverted at said receiving device and supplied to said microcontroller at a sampling rate which can be defined;
- a switchover device, the operating mode A being selectable by said switchover device;
- said microcontroller or said receiving device decimates the data by selecting a subset from a set of samples;
- said microcontroller buffers in said memory and provides for further processing of decimated data; and
- a clock generator, wherein the radio receiver is of a type in which signal processing is implemented at least mainly by hardware, and a sampling error is modified by selecting said clock generator on a basis of its clock frequency.

\* \* \* \* \*